United States Patent
Roure

(10) Patent No.: US 10,379,243 B2
(45) Date of Patent: Aug. 13, 2019

(54) METHOD AND APPARATUS FOR CHARACTERIZING AZIMUTHAL ANISOTROPY USING STATISTICAL MOMENTS

(71) Applicant: CGG SERVICES SA, Massy (FR)

(72) Inventor: Benjamin Roure, Calgary (CA)

(73) Assignee: CGG SERVICES SAS, Massy (FR)

( * ) Notice: Subject to any disclaimer, the term of this patent is extended or adjusted under 35 U.S.C. 154(b) by 300 days.

(21) Appl. No.: 15/127,891

(22) PCT Filed: Mar. 26, 2015

(86) PCT No.: PCT/IB2015/000548
§ 371 (c)(1),
(2) Date: Sep. 21, 2016

(87) PCT Pub. No.: WO2015/145257
PCT Pub. Date: Oct. 1, 2015

(65) Prior Publication Data
US 2017/0102471 A1    Apr. 13, 2017

Related U.S. Application Data

(60) Provisional application No. 61/971,569, filed on Mar. 28, 2014.

(51) Int. Cl.
*G01V 1/30* (2006.01)

(52) U.S. Cl.
CPC ........ *G01V 1/306* (2013.01); *G01V 2210/626* (2013.01)

(58) Field of Classification Search
CPC .................................................... G01V 1/306
See application file for complete search history.

(56) References Cited

U.S. PATENT DOCUMENTS 6,061,301 A * 5/2000 Corrigan .................. G01V 1/36
                                                                 367/51
6,982,927 B2   1/2006 Taner
(Continued)

FOREIGN PATENT DOCUMENTS

AU      2011224165 B2    9/2011

OTHER PUBLICATIONS

Bakulin et al., Estimation of Fracture Parameters From Reflection Seismic Data—Part 1: HTI Model Due to a Single Fraction Set, Geophysics, vol. 65, No. 6, Nov. 2000, p. 1788-1802 (Year: 2000).*
(Continued)

*Primary Examiner* — Manuel L Barbee
*Assistant Examiner* — Raymond L Nimox
(74) *Attorney, Agent, or Firm* — Patent Portfolio Builders PLLC

(57) ABSTRACT

A method for evaluating anisotropy parameters using statistical moments calculates second and third central moments using reflectivity values associated with pairs of incidence and azimuth angles. The method further determines tangential and normal weaknesses for the location using the calculated second and third central moments for different incident angles. Linear and non-linear inversions of statistical moments are used to estimate the fracture weaknesses, anisotropic gradient (biased and unbiased), anellipticity variation and unambiguous orientation.

20 Claims, 8 Drawing Sheets

(56) References Cited

U.S. PATENT DOCUMENTS

| | | | |
|---|---|---|---|
| 8,792,303 B2 | 7/2014 | Downton et al. | |
| 2003/0125878 A1* | 7/2003 | Bakulin | G01V 1/30 702/14 |
| 2006/0184488 A1 | 8/2006 | Wentland | |
| 2007/0260404 A1* | 11/2007 | Dong | G01V 1/32 702/16 |
| 2009/0010104 A1* | 1/2009 | Leaney | G01V 1/364 367/47 |
| 2011/0182144 A1* | 7/2011 | Gray | G01V 1/30 367/75 |
| 2011/0222370 A1* | 9/2011 | Downton | G01V 1/282 367/73 |
| 2012/0090834 A1 | 4/2012 | Imhof et al. | |
| 2014/0262250 A1* | 9/2014 | Bansal | G01V 1/303 166/254.2 |

OTHER PUBLICATIONS

International Search Report in related International Application No. PCT/IB2015/000548, dated Nov. 2, 2015.

Written Opinion of the International Searching Authority in related International Application No. PCT/IB2015/000548, dated Nov. 2, 2015.

F A.V. Artola et al., "Sensitivity Analysis of Gassmann's Fluid Substitution Equations: Some Implications in Feasibility Studies of Time-Lapse Seismic Reservoir Monitoring", Journal of Applied Geophysics, 2006, vol. 59, pp. 47-62.

A. Bakulin et al., "Estimation of Fracture Parameters from Reflection Seismic Data—Part II: Fractured Models with Orthorhombic Symmetry", Geophysics, Nov.-Dec. 2000, vol. 65, No. 6, pp. 1803-1817.

J. Downton et al., "Azimuthal Fourier Coefficients", CSEG Recorder, Dec. 2011, vol. 36, No. 10.

B. Gurevich et al., "An Analytical Model for Stress-Induced Anisotropy of a Cracked Solid", SEG 80th Annual International Meeting, Denver, Colorado, 2010.

L. Ikelle, "Amplitude Variations with Azimuths (AVAZ) Inversion Based on Linearized Inversion of Common Azimuthal Sections", (eds E. Fjaer et al.), SEG, 1996, pp. 601-644.

M. Perez et al., "Developing Templates for Integrating Quantitative Geophysics and Hydraulic Fracture Completions Data: Part I—Principles and Theory", SEG 81st Annual International Meeting, San Antonio, Texas, 2011, pp. 1794-1798.

B. Roure et al., "Azimuthal Fourier Coefficient Elastic Inversion", CSEG GeoConvention 2012: Vision.

A. Rüger, "Variation of P-wave Reflectivity with Offset and Azimuth in Anisotropic Media", Geophysics, May-Jun. 1998, vol. 63, No. 3, pp. 935-947.

C. Sayers et al., "Azimuth-Dependent AVO in Reservoirs Containing Non-Orthogonal Fracture Sets", Geophysical Prospecting, 2001, vol. 49, pp. 100-106.

M. Schoenberg, "Elastic Wave Behavior Across Linear Slip Interfaces", Journal of the Acoustical Society of America, Nov. 1980, vol. 68, pp. 1516-1521.

\* cited by examiner

METHOD AND APPARATUS FOR CHARACTERIZING AZIMUTHAL ANISOTROPY USING STATISTICAL MOMENTS

CROSS REFERENCE TO RELATED APPLICATIONS

This application is a National Stage of International Application No. PCT/IB2015/000548, filed Mar. 26, 2015, which claims priority and benefit from U.S. Provisional Patent Application No. 61/971,569, filed Mar. 28, 2014, for "Statistical moments for azimuthal anisotropy characterization," the content of which are incorporated in their entirety herein by reference.

BACKGROUND

Technical Field

Embodiments of the subject matter disclosed herein generally relate to seismic data analysis or, more specifically, to using statistical moments of seismic data to extract anisotropic information such as fracture and stress properties.

Discussion of the Background

In the field of oil and gas exploration and recovery, analysis of seismic data obtained through seismic surveys provides valuable information about structure and physical parameters of subterranean rock formations. In a seismic survey, a source generates a seismic signal that propagates into the explored formation and is, at least partially, reflected at interfaces between a formation's layer having different acoustic impedances. The seismic signal is typically a compressional pressure variation along the propagation direction (P-wave), but both P-waves and S-waves (i.e., shear waves) may be detected. Seismic detectors record seismic data which represent the detected waves. In fact, the recorded seismic data includes a convolution of the source wavelet (i.e., the signal's signature) and the formation's response function. Seismic data processing extracts the formation's response function, and then various parameters related to the explored formation. One way of expressing the response function is reflectivity, R, which for detected P-waves is $R_{pp}$. Reflectivity may be expressed as a function of the incidence angle, $\theta$, (which is defined in a vertical plane relative to the source position) and of the azimuth angle, $\phi$ (which is defined in a horizontal plane around the source position). From the point of view of this approach, seismic data and reflectivity are the same.

Seismic data processing methods include azimuthal velocity correction, amplitude versus offset (AVO) analysis and inversion, amplitude versus offset and azimuth analysis (AVOAz) and inversion of conventional three-dimensional (3D) seismic data, and birefringence analysis of multicomponent 3D seismic data. Reflectivity characterizes subterranean properties and can serve as input to other inversion algorithms. For example, reflectivity can provide useful information regarding the anisotropy parameters of the subterranean formation, such as subsurface fractures. These anisotropy parameters may reveal shale plays, tight gas sands and coal bed methane, as well as carbonates in naturally fractured reservoirs. Note that these remarks are true also for seismic data in general. These characteristics and parameters are used to design and manage underground transportation systems, foundations of major structures, cavities for storage of liquids, gases or solids, etc. In oil and gas exploration, this kind of information is used for determining optimal locations and orientations of wells (which may be vertical, inclined or deviated, and horizontal), to minimize wellbore instability and formation break-out. This information may also be used for stimulating the production of hydrocarbons by applying hydraulic pressure on the formation from the wellbore. The data inversions yield estimates of the elastic stiffnesses (velocities and anisotropic parameters) that can be used to predict lithology, porosity and the fluid content of the subsurface, as well as intensity and orientation of fractures in subterranean formations.

Conventional AVO inversions provide only band-limited fractional elastic parameters estimates with reduced resolution and quality (i.e., the bandwidth of seismic data is always less than the bandwidth of the desired reflectivities). Conventional AVOAz inversions are typically based on the near offset approximation of the equation set forth by Rügger, A., 2002, "Reflection coefficients and azimuthal AVO Analysis in anisotropic media," SEG geophysical monograph series number 10: Soc. Expl. Geophys (hereinafter "Rüger"). Rüger provides the equation showing the amplitude R with azimuth $\varphi$ for narrow angles of incidence $\theta$. However, this method has a number of limitations. For example, the near offset Rüger equation is not theoretically valid for the case of two anisotropic half-spaces with different anisotropy orientation. Further, there is a 90-degree ambiguity associated with the estimate of the isotropy plane.

Recently, separating azimuthal AVO into AVO (Amplitude Versus Offset) and AVAz (Amplitude Versus Azimuth) has been achieved using Fourier coefficients (FCs) as described in U.S. Pat. No. 8,792,303 (the content of which is incorporated in its entirety herein by reference). This separation advantageously avoids coupling between the isotropic and anisotropic properties.

Accordingly, it is desirable to enhance existing methods and provide new methods to extract anisotropic properties without the drawbacks and limitations of conventional methods.

SUMMARY

Methods and apparatuses according to some of the embodiments use statistical moments to separate AVO and AVAz and to extract anisotropy parameters. Under some assumptions, the moments are independent of the anisotropy orientation. The second and third central moments of azimuthal data are related to the anisotropic gradient and anellipticity variation, respectively. The moments can be combined to obtain more fundamental anisotropic properties, which can then be used to obtain unbiased estimates of the anisotropic gradient and orientation. Moments may be further used in combination with Fourier coefficients to help the interpretation and yield anisotropy model properties that closer relate data and model spaces.

According to an embodiment, there is a method for evaluating anisotropy parameters using statistical moments. The method includes obtaining seismic data considered as reflectivity values associated with pairs of incidence, $\theta$, and azimuth $\varphi$ angles related to an explored formation, and calculating second central moment, $m_2(\theta)$, for at least two different incident angles and third central moment, $m_3(\theta)$, for at least one incident angle at a location within the explored formation using the reflectivity values. The method further includes obtaining tangential and normal weaknesses for the location using the calculated second and third central moments.

According to another embodiment, there is an apparatus for evaluating anisotropy parameters from seismic data using statistical moments having an interface and a data processing unit. The interface is configured to obtain seismic data considered as reflectivity values associated with pairs of incidence, θ, and azimuth φ angles related to an explored formation. The data processing unit includes one or more processors and is configured to calculate second central moment, $m_2(\theta)$, for at least two different incident angles and a third $m_3(\theta)$ central moment for at least one incident angle at a location within the explored formation using the reflectivity values. The data processing unit is further configured to determine tangential and normal weaknesses for the location using the calculated second and third central moments.

According to yet another embodiment, there is a computer readable recording medium non-transitorily storing executable codes which when executed by a computer make the computer perform a method for evaluating anisotropy parameters from seismic data using statistical moments. The method includes obtaining seismic data considered as reflectivity values associated with pairs of incidence, θ, and azimuth φ angles related to an explored formation, and calculating second central moment, $m_2(\theta)$, for at least two different incident angles and third central moment, $m_3(\theta)$, for at least one incident angle at a location within the explored formation using the reflectivity values. The method further includes obtaining tangential and normal weaknesses for the location using the calculated second and third central moments.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
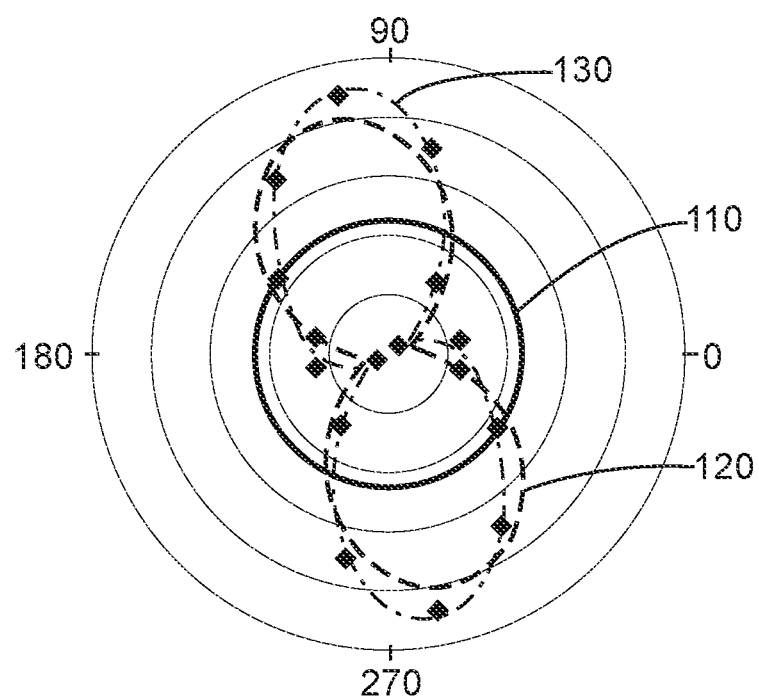
FIG. 1 is a polar graph of amplitude versus azimuth illustrating seismic data distributions.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed relative to analyzing seismic data to estimate elastic parameters of a subterranean formation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Statistical moments of reflectivity provide another tool to extract anisotropic information from seismic data. Moments, which may be expressed as non-linear combinations of FCs, provide the benefits of decoupling AVO and AVAz reflectivity properties (e.g., avoiding leakage between isotropic and anisotropic properties estimation), and of decoupling the AVAz reflectivity properties from the anisotropy orientation. In one embodiment, the anisotropic gradient for small incidence angles is obtained from the second central moment using one angle of incidence. In another embodiment, the anellipticity variation is obtained using the fourth FC and the third central moment for only one angle of incidence. In yet another embodiment, the normal and tangential weaknesses variations (which yield the unbiased anisotropic gradient and unambiguous orientation) are obtained by combining the second (or the third) central moment defined at two angles of incidence and the anellipticity variation defined at one angle of incidence. Some templates are provided to illustrate the manner in which the moments and FCs data spaces relate to each other. Anisotropic templates are defined using a theoretical model to help with interpretation of the data.

Moments are used in statistics to provide quantitative measures of distributions of points. There are different types of moments, including raw moments, central moments and normalized central (or standardized) moments. Raw moments are defined about the origin, and their discrete expression for an equi-probability variable X of dimension N is:

$$m_n^{(r)} = E[X^n] = \frac{1}{N}\sum_{i=1}^{N} X_i^n \qquad (1)$$

where E denotes the expectation and n is the order of the moment.

The first raw moment $m_1^{(r)}$ is the mean μ, which is used in the definition of central moments:

$$m_n = E[(X-\mu)^n] = \frac{1}{N}\sum_{i=1}^{N}(X_i-\mu)^n. \qquad (2)$$

The second central moment $m_2$ is the variance, which is a measure of the dispersion or scatter of the data about the mean. The square root of $m_2$ is the standard deviation σ, which is used in defining standardized moments:

$$m'_n = E\left[\left(\frac{X-\mu}{\sigma}\right)^n\right] = \frac{1}{N}\sum_{i=1}^{N}\left(\frac{X_i-\mu}{\sigma}\right)^n \quad (3)$$

The third standardized moment $m_3'$ is called the skewness, which is a measure of the asymmetry or lopsidedness of a distribution. For a symmetrical distribution, $m_3'=0$.

The mean, the variance, the skewness and higher order moments can be used to characterize any distribution. If AVAz amplitudes or reflectivities at a given angle of incidence are a set of points following a distribution (let us call it "AVAz distribution"), then statistical moments provide quantitative measures of the shape of the distribution. FIG. 1 illustrates this concept with different types of azimuthal anisotropy for a given incidence angle. The points represent seismic amplitude measurements for a given incidence angle at different azimuths and the curves represent fit to these points with different level of accuracy. Line 110 is an isotropy fit, line 120 is elliptical anisotropy fit and line 130 is an anelliptical anisotropy fit. The radius of each circle in this polar graph corresponds to an amplitude value, and the azimuth angle ϕ increases counterclockwise from the rightmost point (trigonometric reference system).

Figure 2:
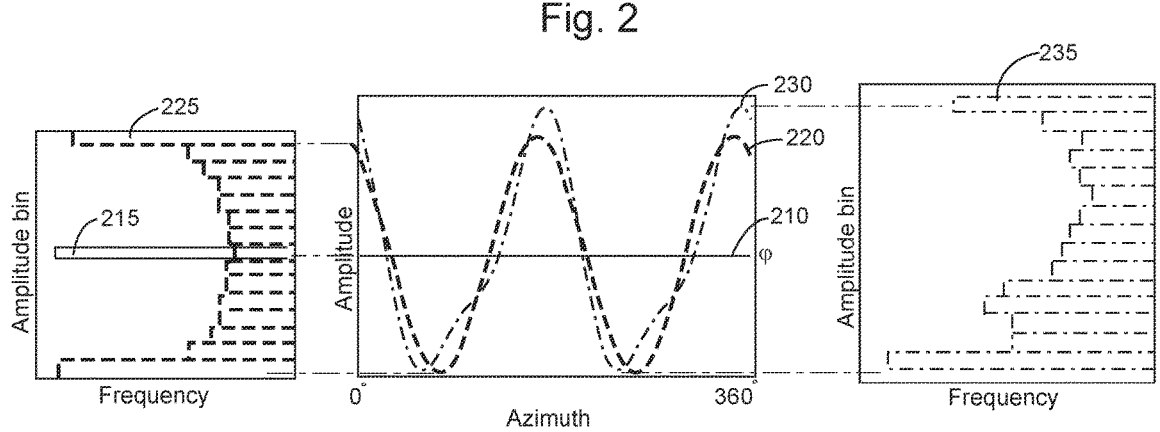
FIG. 2 includes an orthogonal graph of amplitude versus azimuth illustrating the same seismic data distributions as in FIG. 1, the graph being framed by histograms illustrating amplitude distributions (i.e., projections on y-axis of the orthogonal graph)

FIG. 2 includes a two-dimensional amplitude-versus-azimuth angle graph (instead of FIG. 1's polar representation) of these fits, with line 210 corresponding to 110, line 220 to 120 and line 230 to 130. If the curves are projected into histograms (i.e., projected on y-axis of the two-dimensional graph), the isotropy fit is a single bin 215, the elliptical anisotropy fit is a histogram 225, which is symmetric relative to the middle and peaking at the higher and lower values, and the anelliptical anisotropy fit is a histogram 235, which is an asymmetric distribution of amplitude bins with more lower values than higher values. The shape of such histograms depends on the azimuthal sampling of the amplitude and the size of the bins.

The mean is the same for the three fits. The variance is zero for the isotropy fit (110, 210) and non-zero for the elliptical (120, 220) and anelliptical anisotropy (130, 230). The skewness is zero for the isotropy fit (110, 210) and elliptical anisotropy fit (120, 220), but non-zero for the anelliptical isotropy fit (130, 230). Thus, moments carry information on azimuthal anisotropy. The variance is a measure of the dispersion or scatter about the mean. If the values are concentrated near the mean (which is the case for negligible azimuthal anisotropy), the variance is small. In contrast, if the values are distributed far from the mean (which is the case for significant anisotropy), the variance is large. The skewness seems to be sensitive to anellipticity.

As stated in the article "Amplitude variation with azimuths (AVAz) inversion based on linearized inversion of common azimuth sections" by Ikelle, L. T., published in Seismic Anisotropy, pp. 601-644, SEG, Tulsa (which is incorporated herewith by reference in its entirety), the azimuthal PP reflectivity, $R_{PP}$, may be expressed using FCs for an incidence angle θ and an azimuth angle ϕ as:

$R_{PP}(\theta,\phi) = r_0(\theta) + r_2(\theta)\cos 2(\phi-\phi_2) + r_4(\theta)\cos 4(\phi-\phi_4).$ (4)

where $r_i$ and $\phi_i$ are respectively the magnitude and the phase of the $i^{th}$ FC.

Lines 210, 220 and 230 in FIG. 2 may be reconstructed signal using FC of different orders. The constant amplitude fit (line 210) is using the $0^{th}$ order FC $r_0$, which is azimuthally invariant. The elliptical fit (line 220) is a $2^{nd}$ order FC approximation using the terms $r_0$ and $r_2$. The anelliptical fit (line 230) is a $4^{th}$ order FC approximation using the terms $r_0$, $r_2$ and $r_4$. As the order of the approximation increases, the fit improves as illustrated in FIG. 1. For simplicity, the phase of the FCs is assumed to be the same ($\phi_2=\phi_4$). As discussed In the article "Azimuth-dependent AVO in reservoirs containing non-orthogonal fracture sets" by Sayers, C., and S. Dean, published in Geophysical Prospecting, 49, pp. 100-106, in 2001, this assumption is valid (1) in the case of an isotropic layer over an anisotropic layer where the anisotropy of the second layer is due to a single vertical fracture set, and (2) in the case of two or more non-orthogonal sets of vertical fractures when the normal to tangential compliance ratio is 1 and each fracture set has equal weight.

The first raw moment (or mean) of azimuthal data is simply the $0^{th}$ FC $r_0$. This term does not depend on the azimuth (i.e., it is an amplitude versus offset, AVO, term).

The second central moment $m_2$ of azimuthal data may be expressed as:

$$m_2(R_{PP}(\theta,\phi)) = m_2(\theta) = \frac{1}{2}(r_2^2(\theta) + r_4^2(\theta)). \quad (5)$$

The third central moment $m_3$ may be expressed as:

$$m_3(R_{PP}(\theta,\phi)) = m_3(\theta) = \frac{3}{4}r_2^2(\theta)r_4(\theta). \quad (6)$$

Figure 3:
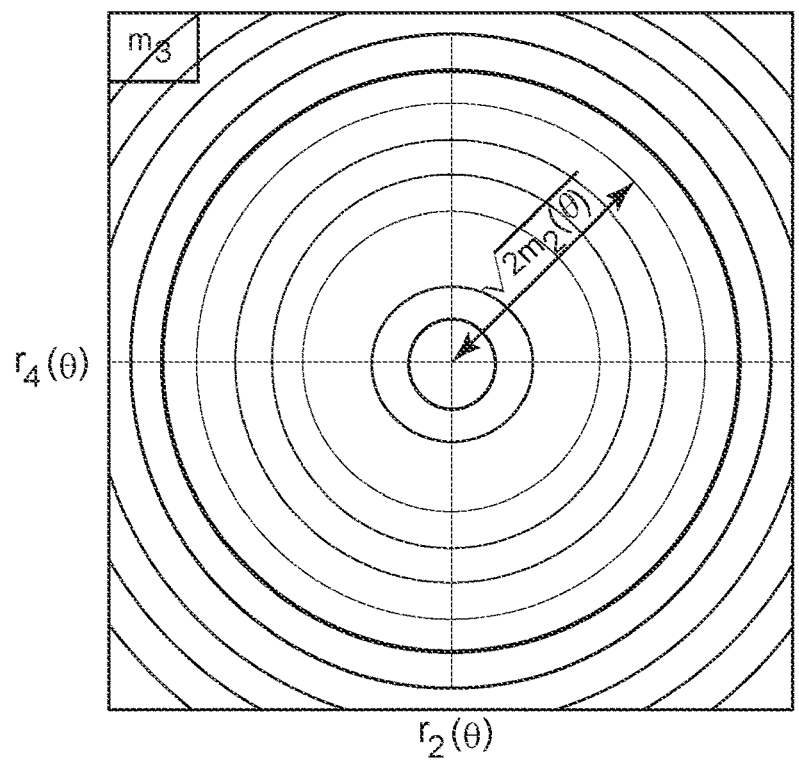
FIG. 3 illustrates circles corresponding to the second central moment values in a $4^{th}$ versus $2^{nd}$ Fourier coefficient space.
Figure 4:
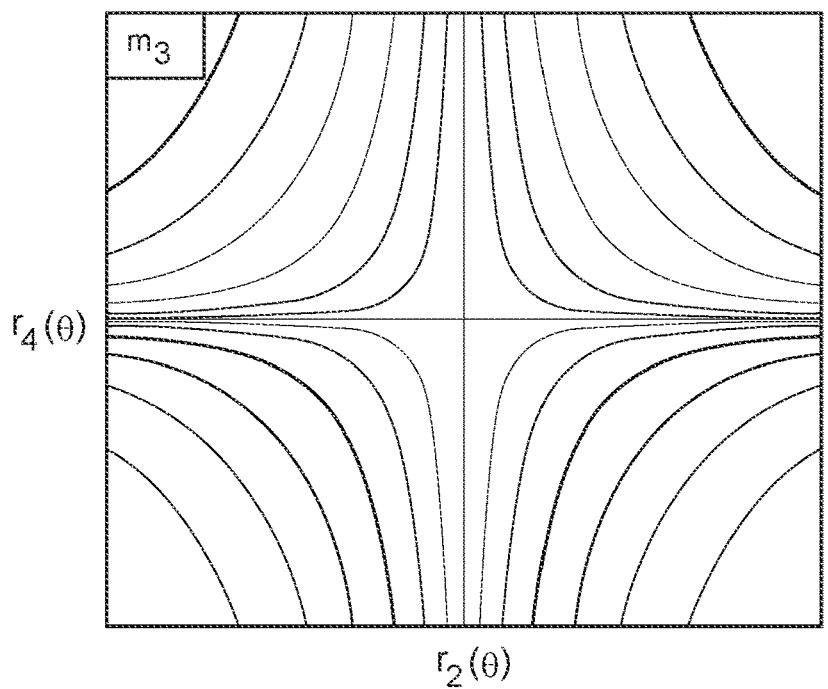
FIG. 4 illustrates hyperbolas corresponding to the third central moment values in the $4^{th}$ versus $2^{nd}$ Fourier coefficient space.
Figure 5:
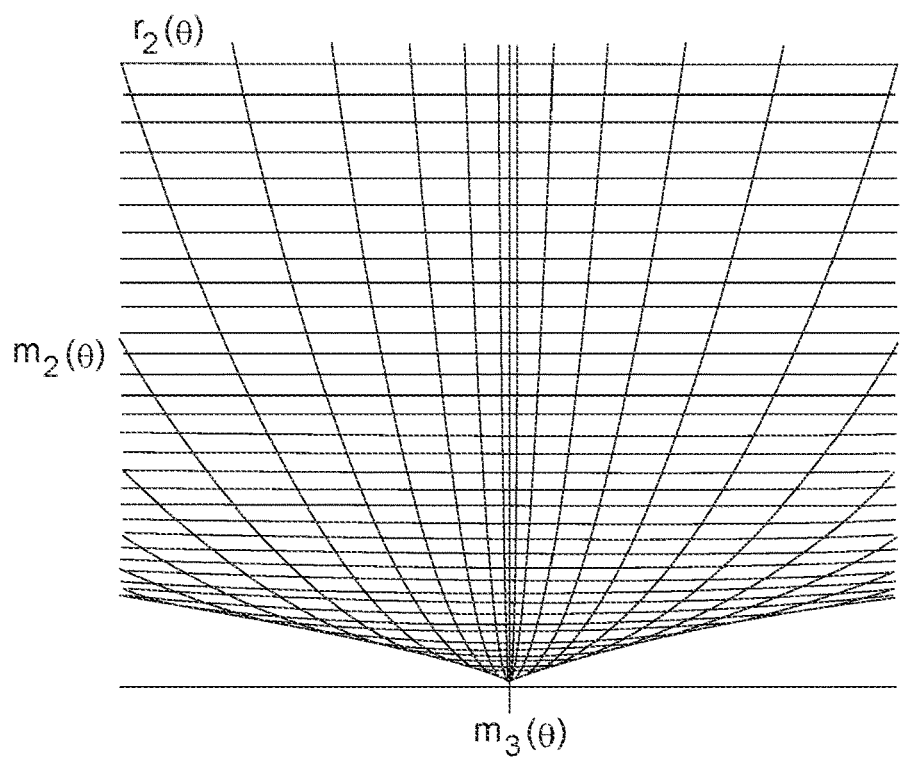
FIG. 5 illustrates $2^{nd}$ Fourier coefficient values in a second versus third central moment space.
Figure 6:
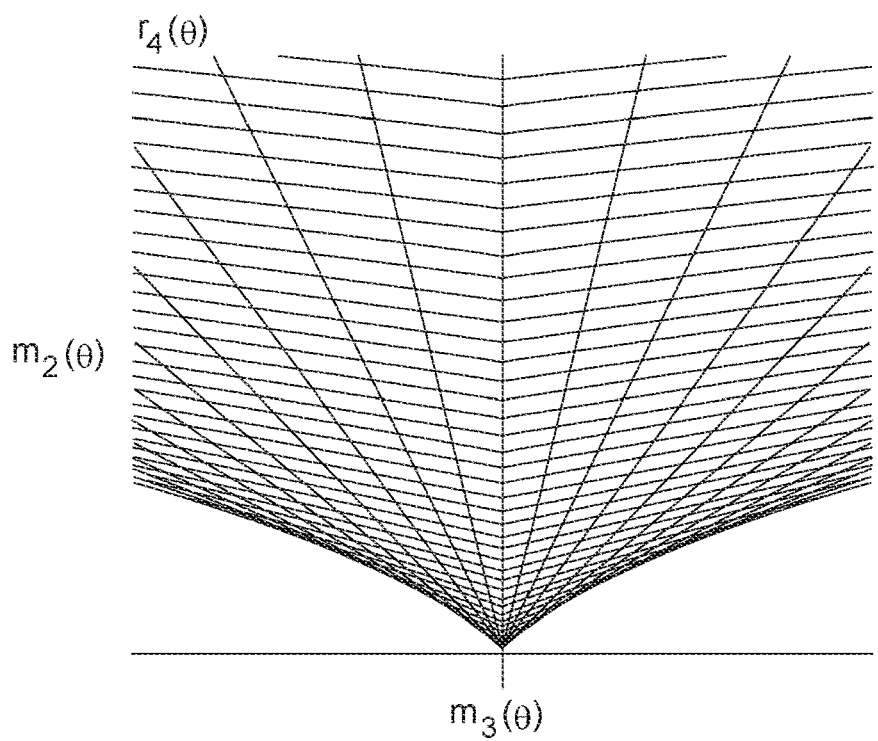
FIG. 6 illustrates $4^{th}$ Fourier coefficient values in a second versus third central moment space.

The second and third central moments are non-linear combinations of the second and fourth FCs (i.e., $r_2$ and $r_4$), which do not contain AVO reflectivity properties. Thus the AVO and AVAz problems are decoupled (similar to FCs). Since the second and third central moments do not depend on phase (i.e., the anisotropy orientation), the anisotropy orientation is decoupled from anisotropy intensity. As illustrated in FIGS. 3 and 4, $m_2$ is a circle of center (0,0) and radius $(2m_2(\theta))^{1/2}$ and $m_3$ is a hyperbola in the FC data space $(r_2(\theta), r_4(\theta))$. These graphs' origins correspond to the isotropy case. In FIGS. 5 and 6, $r_2$ and $r_4$ are illustrated in $(m_2, m_3)$ data space.

Under the assumption that anisotropy is due to a single set of rotationally invariant vertical fractures (i.e., HTI or azimuthal anisotropy), the Linear Slip theory (as set forth in the article, "Elastic behavior across linear slip interfaces," by Schoenberg published in the Journal of the Acoustical Society of America, 68, pp. 1516-1521, 1980), defines a simple theoretical relationship between the seismic data and the anisotropic model properties, namely the normal and tangential weaknesses $\delta_N$ and $\delta_T$. The expressions of FCs in terms of Linear Slip properties are explained in the article, "Azimuthal Fourier Coefficients," by Downton, J., B. Roure, and L. Hunt, published in the Canadian Society of Exploration Geophysics Recorder, 36, #10, 22-36, in 2011. Thus, $r_2(\theta)$ and $r_4(\theta)$ are:

$$r_2(\theta) = \frac{1}{2}(B_{ani} + g(g-1)\Delta\delta_N\tan^2\theta)\sin^2\theta \quad (7)$$

$$r_4(\theta) = \frac{1}{16}\Delta\eta\sin^2\theta\tan^2\theta \text{ where} \quad (8)$$

$$B_{ani} = g(\Delta\delta_T - \chi\Delta\delta_N) \quad (9)$$

$$\Delta\eta = 2g(\Delta\delta_T - g\Delta\delta_N) \quad (10)$$

Figure 7:
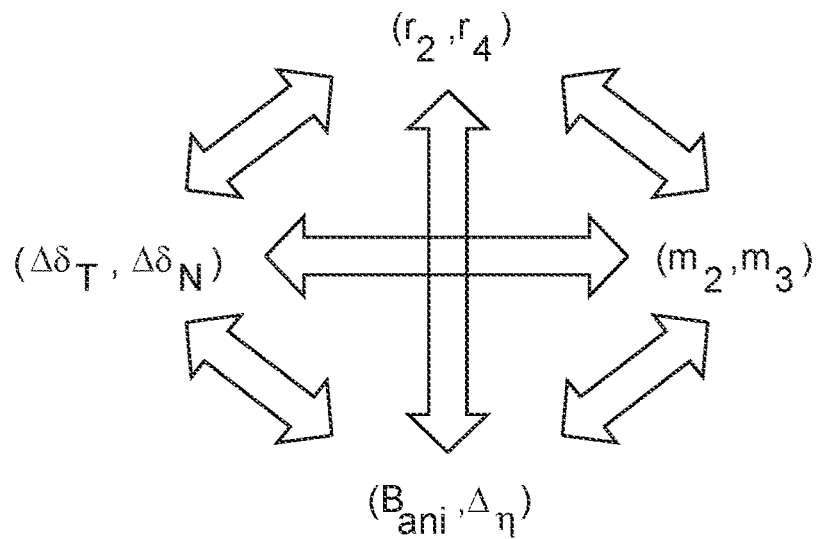
FIG. 7 schematically suggests relationships between coefficients and model spaces.

$B_{ani}$ is the anisotropic gradient, η is the anellipticity (as defined in the article, "Estimation of fracture parameters from reflection seismic data—Part 1: HTI model due to a single fracture set," by Bakulin et al., published in Geophysics, 65 (8), pp. 1803-1817, 2000), and Δ represents the difference between the values above and below the interface. g is the square of the S-wave to P-wave velocity ratio of the non-fractured rock and $\chi=1-2g$. FIG. 7 illustrates different parameter spaces which can be converted from one another. For example equations (9) and (10) indicate conversion from model space ($\Delta\delta_T$, $\Delta\delta_N$) to model space ($B_{ani}$, $\Delta\eta$). Equations corresponding to reverse transition (i.e., from model space ($B_{ani}$, $\Delta\eta$) to model space ($\Delta\delta_T$, $\Delta\delta_N$)) are easily obtained since equations (9) and (10) are linear. The weaknesses ($\Delta\delta_T$, $\Delta\delta_N$) are sometimes considered more fundamental and less ambiguous properties than $B_{ani}$, $\Delta\eta$.

The $2^{nd}$ and $4^{th}$ FCs can be expressed in terms of weaknesses variations as:

$$\begin{pmatrix} r_2(\theta) \\ r_4(\theta) \end{pmatrix} = \begin{pmatrix} a(\theta) & b(\theta) \\ c(\theta) & d(\theta) \end{pmatrix} \begin{pmatrix} \Delta\delta_T \\ \Delta\delta_N \end{pmatrix} \text{ where} \quad (11)$$

$$\begin{pmatrix} a(\theta) & b(\theta) \\ c(\theta) & d(\theta) \end{pmatrix} = \frac{1}{2} g \sin^2(\theta) \begin{pmatrix} 1 & -\chi\left(1+\left(\frac{1+\chi}{2\chi}\right)\tan^2(\theta)\right) \\ \frac{1}{4}\tan^2(\theta) & -\frac{1}{4}g\tan^2(\theta) \end{pmatrix}. \quad (12)$$

Mathematical manipulations of equations reveal that the second central momentum is an ellipse in ($\Delta\delta_T$, $\Delta\delta_N$) space. The matrix in equation (12) transforms the circle in the ($r_2$, $r_4$) space (equation 5) into an ellipse in ($\Delta\delta_T$, $\Delta\delta_N$) space (equation 15).

The following linear inversions allow obtaining anisotropic properties (the anisotropic gradient $B_{ani}$ and the anellipticity variation $\Delta\eta$) from the second and third central moments, respectively. For small angles of incidence, the term $\sin^2(\theta)\tan^2(\theta)$ becomes negligible in equations (7) and (8), and then by injecting equations (7) and (8) into equation (5), it follows that the anisotropic gradient $B_{ani}$ is linearly related to the square root of the second central moment $m_2(\theta)$:

$$B_{ani} \approx \frac{2\sqrt{2}}{\sin^2(\theta)}\sqrt{m_2(\theta)}. \quad (13)$$

Due to the square root, this estimation of the anisotropic gradient is restricted to positive values only, similar to the near offset Rügger equation or a simple Fourier transform. Formula (13) can actually be extended to any even moments (n=2, 4, 6, ... ), i.e., the anisotropic gradient is linearly related to the $n^{th}$ root of the $n^{th}$ moment if n is even.

A simple Fourier transform gives the squared magnitude $r_2^2(\theta)$ and $r_4^2(\theta)$ but with no indication on the sign (see, e.g., equation (5) in the previously-mentioned article by Downton et al.). Based on equations (6) and (8), the third moment has the same sign as the anellipticity variation $\Delta\eta$ and therefore $r_4(\theta)$. The anellipticity variation can hence be obtained from the third moment using a single angle of incidence as:

$$\Delta\eta = \frac{64}{3}\frac{1}{\sin^2\theta\tan^2\theta}\frac{1}{r_2^2(\theta)}m_3(\theta). \quad (14)$$

$B_{ani}$ and $\Delta\eta$ calculated using moments yields results similar to the values obtained using FCs (similarity which is a validation of the moments approach). The benefit of using moments is that the anellipticity is computed with only one angle of incidence, while the calculation using FCs requires at least two angles of incidence. Using one angle of incidence instead of two is advantageous because inconsistencies between data corresponding to the two angles of incidence may be present due to data quality.

Figure 8:
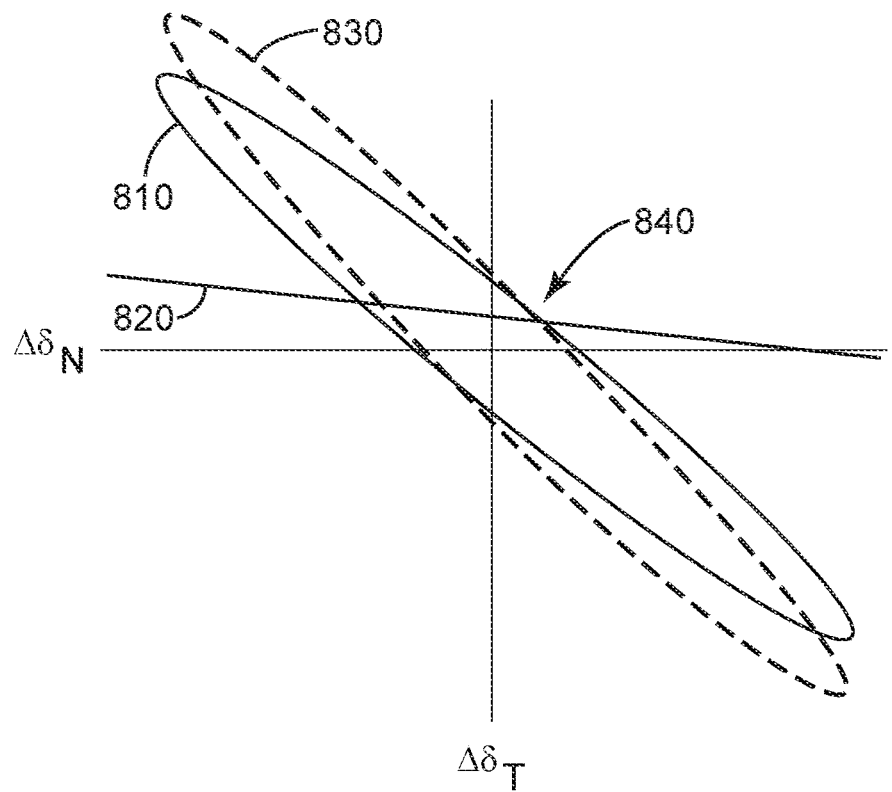
FIG. 8 illustrates obtaining the tangential and normal weaknesses using second central moments for two angles of incidence and anellipticity variation for one angle of incidence in a tangential and normal weaknesses space.

Estimating the tangential and normal weaknesses from the moments is a non-linear problem illustrated in FIG. 8. Although a graphical method (with ellipses and lines) of obtaining ($\Delta\delta_T$, $\Delta\delta_N$) is explained below, the solution may be obtained also by solving equations, which may be computationally more efficient. In the ($\Delta\delta_T$, $\Delta\delta_N$) space, the second central moment $m_2(\theta)$ defines an ellipse 810, all the points on this ellipse being possible solutions. In other words, having calculated the second central moment from azimuthal seismic data, it is impossible to determine which ($\Delta\delta_T$, $\Delta\delta_N$) couple is the real one along the ellipse. The third central momentum $m_3(\theta)$ can then be used to partially resolve this ambiguity. By providing an estimate of the anellipticity variation $\Delta\eta$, $m_3(\theta)$ linearly couples $\Delta\delta_T$ and $\Delta\delta_N$ through equation (10), restricting actual values ($\Delta\delta_T$, $\Delta\delta_N$) to line 820. Thus, combining the second and third central moments at a single angle of incidence restricts the number of ($\Delta\delta_T$, $\Delta\delta_N$) solutions to two, i.e., the points where line 820 intersects ellipse 810. Selecting one among the two possible solutions may be resolved by considering the second central moment defined at another angle of incidence as illustrated by ellipse 830. The intersection with ellipse 830 indicates the real one among the two solutions. Since the existence and uniqueness of the solution are conditional upon the assumptions made, a confidence map provided alongside the results may be useful.

Once $\Delta\delta_T$ and $\Delta\delta_N$ are known, an unbiased expression of the anisotropic gradient $B_{ani}$ (not limited to positive values) is given by equation (9). The estimation of these anisotropic properties is done independently from the anisotropy orientation. Further, the phase of the $2^{nd}$ FC $r_2$ may be used to obtain the symmetry axis $\phi_{sym}$ (i.e., the direction perpendicular to fractures). The Fourier transform yields the magnitude of the $2^{nd}$ FC (limited to positive values) and its associated phase that wraps up every 90 degrees (the phase of the $n^{th}$ FC is defined in $[-\pi/(2n), +\pi/(2n)]$). The actual phase can be obtained by simply adding 90 degrees whenever the sign of the $2^{nd}$ FC $r_2(\theta)$ obtained using equation (7) is negative. In other words, the 90-degree ambiguity on the orientation is resolved by removing the ambiguity on the sign of the $2^{nd}$ FC magnitude.

Figure 9:
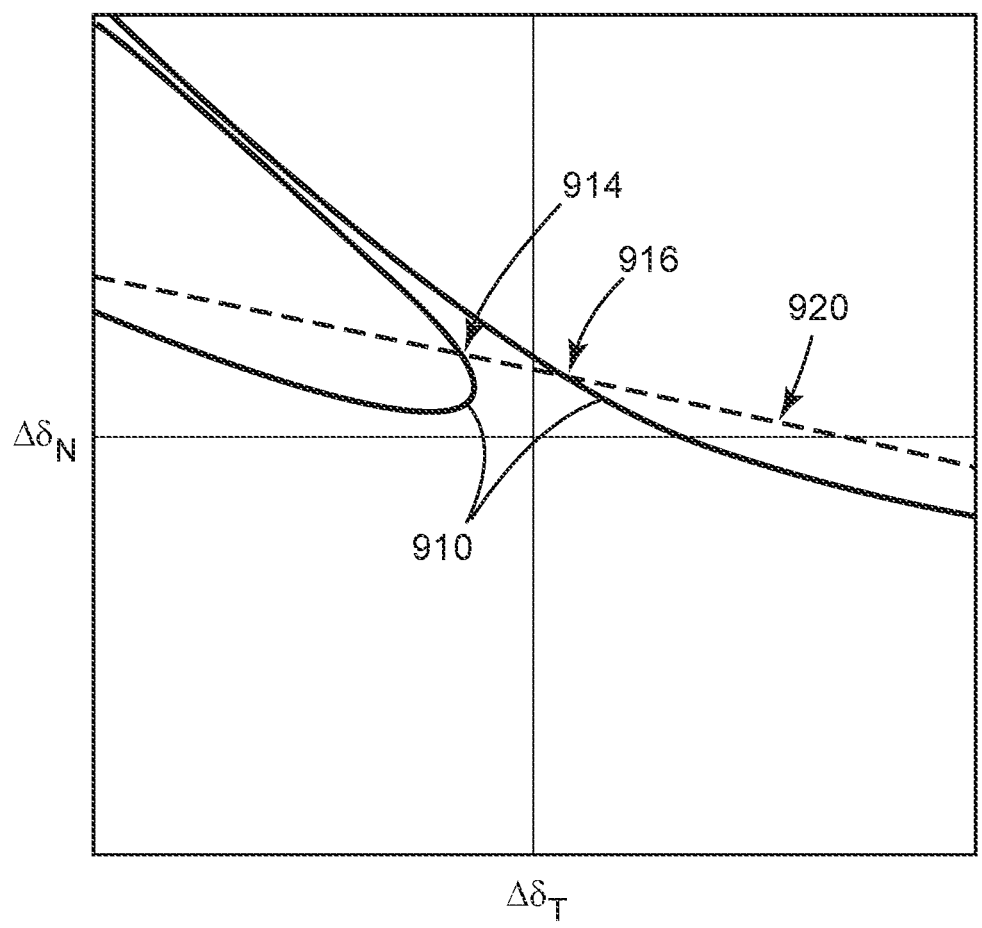
FIG. 9 illustrates obtaining the tangential and normal weaknesses using third central moments.

The same technique as presented above using the second central moments defined at two angles of incidence can also be used with the third central moments, providing the same results as described hereinafter relative to FIG. 9 and formula 16. As illustrated in FIG. 9, in the ($\Delta\delta_T$, $\Delta\delta_N$) space, the third central moment $m_3$ for one angle defines a hyperbola 910, all the points on this hyperbola being possible solutions. The estimate of the anellipticity variation $\Delta\eta$ linearly couples $\Delta\delta_T$ and $\Delta\delta_N$ through equation (10), restricting actual values ($\Delta\delta_T$, $\Delta\delta_N$) to line 920. The intersections of line 920 with hyperbola 910 yields two possible solutions 914 and 916, which can be further selected using the third central moment $m_3$ for another angle.

Mathematically, if the $2^{nd}$ and $4^{th}$ FCs are expressed in terms of weaknesses variations as set forth in equations 11 and 12, then the second central moment $m_2$ and third central moment $m_3$ are:

$$m_2 = \frac{1}{2}(\Delta\delta_T^2(a^2+c^2) + \Delta\delta_N^2(b^2+d^2) + 2\Delta\delta_T\Delta\delta_N(ab+cd)) \quad (15)$$

-continued $$m_3 = \frac{3}{4}(\Delta\delta_T^3 a^2 c + \Delta\delta_N^3 b^2 d +$$
$$\Delta\delta_T^2\Delta\delta_N(2abc + a^2 d) + \Delta\delta_T\Delta\delta_N^2(2abd + b^2 c)).$$

The above formalism can be extended to the sixth order FCs, with each FC having a different phase, according to the following formula:

$$\begin{cases} m_2 = \frac{1}{2}(r_2^2 + r_4^2 + r_6^2) \\ m_3 = \frac{3}{4}r_2^2 r_4 \cos 4(\phi_2 - \phi_4) + \frac{3}{2}r_2 r_4 r_6 \cos(2\phi_2 + 4\phi_4 - 6\phi_6) \\ m_4 = \frac{3}{8}(r_2^4 + r_4^4 + r_6^4) + \frac{1}{2}r_2^3 r_6 \cos 6(\phi_2 - \phi_6) + \frac{3}{2}(r_2^2 r_4^2 + r_2^2 r_6^2 + r_4^2 r_6^2) + \ldots \\ \ldots \frac{3}{2}r_2 r_4^2 r_6 \cos(2\phi_2 + 6\phi_6 - 8\phi_4) \\ m_5 = \left(\frac{5}{4}r_2^4 r_4 + \frac{15}{8}r_2^2 r_4^3 + \frac{15}{4}r_2^2 r_4 r_6^2\right)\cos 4(\phi_2 - \phi_4) + \\ \frac{5}{8}r_4^3 r_6^2 \cos 12(\phi_4 - \phi_6) + \ldots \\ \ldots \frac{15}{4}(r_2^3 r_4 r_6 + r_2 r_4^3 r_6 + r_2 r_4 r_6^3)\cos(2\phi_2 + 4\phi_4 - 6\phi_6) \end{cases} \quad (17)$$

Figure 10:
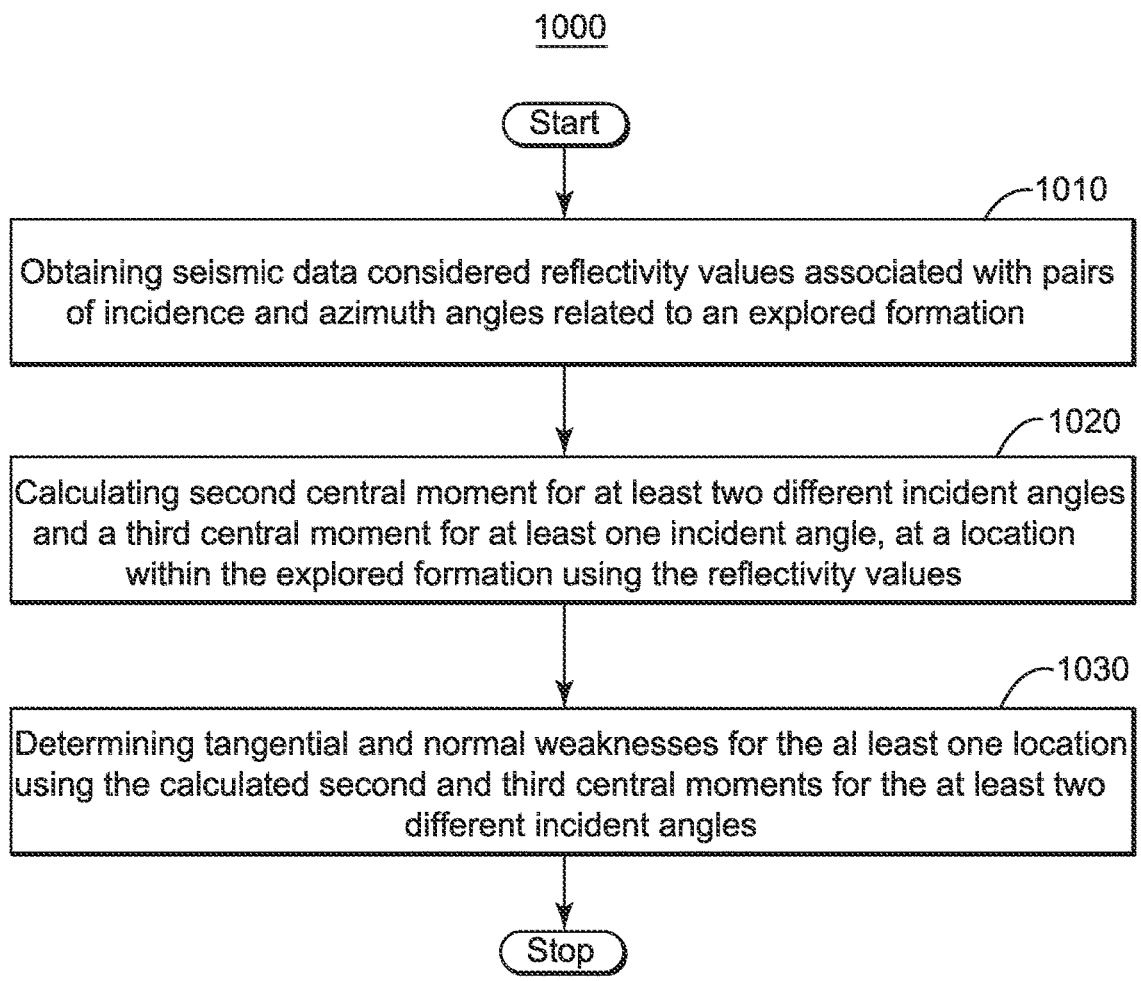
FIG. 10 is a flowchart of a method according to an embodiment.

FIG. 10 is a flowchart of a method 1000 for evaluating anisotropy parameters using statistical moments, according to an exemplary embodiment. Method 1000 includes obtaining seismic data considered as reflectivity values, R(θ, φ), associated with pairs of incidence, θ, and azimuth φ angles related to an explored formation, at 1010.

Method 1000 further includes calculating the second central moment $m_2(\theta)$, for at least two different incident angles and the third central moment, $m_3(\theta)$, for at least one angle of incidence, at a location within the explored formation using the reflectivity values, at 1020. The second and third central moments are calculated using formula (2), where $X_i$ are R(θ, φ) values for different azimuth angles.

Method 1000 then includes determining tangential and normal weaknesses for the location using the calculated second and third central moments for the different incident angles, at 1030. In one embodiment, the tangential and normal weaknesses are determined by representing two of the calculated second moments and the anellipticity variation calculated from the third central moment in a two-dimensional space of the tangential and normal weaknesses. In another embodiment, the tangential and normal weaknesses are determined by representing two third moments and the anellipticity variation, in a two-dimensional space of the tangential and normal weaknesses.

As previously described, a calculated second moment for an incidence angle corresponds to an ellipse, and a calculated anellipticity variation for the incidence angle corresponds to a line in a two-dimensional space of the tangential and normal weaknesses. Parameters defining the ellipse and parameters defining the line are calculated using a square of the S-wave and P-wave velocity ratio, g, of the non-fractured rock and trigonometric functions of the incidence angle, θ.

Method 1000 may also include calculating an anisotropic gradient, $B_{ani}$, for small angles using the second central moment (e.g., using formula 13). Alternatively or additionally, method 1000 may include (A) inferring a $2^{nd}$ Fourier coefficient for an incidence angle using a Fourier transform, and (B) evaluating an anellipticity variation, Δη, using the third central moment for the incidence angle, the inferred $2^{nd}$ Fourier coefficient and the incidence angle (e.g., using formula 14).

Figure 11:
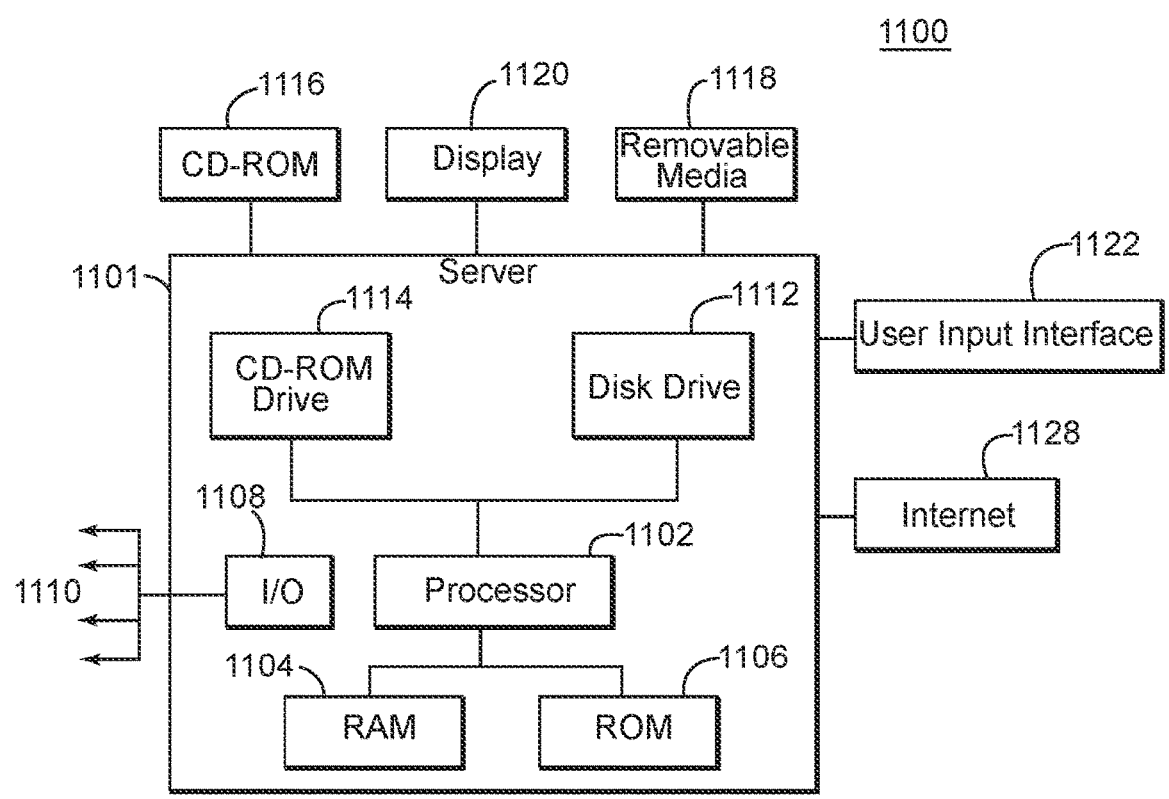
FIG. 11 is a schematic diagram of a seismic data processing apparatus according to an embodiment.

An apparatus 1100 capable of carrying out operations in accordance with the above-discussed methods is illustrated in FIG. 11. Hardware, firmware, software or a combination thereof may be used to perform the various steps and operations described herein. Apparatus 1100 may include server 1101 having a central processing unit (CPU) 1102 which may be coupled to a random access memory (RAM) 1104 and to a read-only memory (ROM) 1106. Memory 1106 represents different types of storage media able to store executable codes. Thus, memory 1106 may be a programmable ROM (PROM), an erasable PROM (EPROM), etc. Central processing unit 1102 includes one or more processors and may be configured to communicate with various internal and external components via input/output (I/O) circuitry 1108 and bussing 1110 to provide control signals and the like.

Server 1101 may also include disk drives 1112, CD-ROM drives 1114, and other hardware employed for reading and/or storing data, such as a DVD, etc. In one embodiment, software for carrying out the above-discussed steps may be stored and distributed on a CD-ROM 1116, removable media 1118 or other form of media non-transitorily storing information. The removable media may be inserted into, and read by, devices such as the CD-ROM drive 1114, disk drive 1112, etc. Server 1101 may be coupled to a display 1120, which may be any type of known display or presentation screen, such as LCD, plasma displays, cathode ray tubes (CRT), etc. Any of the drives may be a user interface configured to obtain (and provide to CPU 1102) reflectivity values associated with pairs of incidence, θ, and azimuth φ angles based on seismic data related to an explored formation.

A user input interface 1122 including one or more user interface mechanisms such as a mouse, keyboard, microphone, touch pad, touch screen, voice-recognition system, etc., may be provided. Server 1101 may be part of a larger network configuration as in a global area network (GAN) such as the Internet 1128. CPU 1102 is configured (A) to calculate the second central moment, $m_2(\theta)$, for at least two angles of incidence and the third central moment, $m_3(\theta)$, for at least one incident angle at a location within the explored formation using the reflectivity values, and (B) to determine tangential and normal weaknesses for the location using the calculated second and third central moments.

Embodiments may be a computer program product which implements methods such as 1000. Accordingly, the embodiments may take the form of an entirely hardware embodiment or a combination of hardware and software. The computer program product may be stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as floppy disk or magnetic tape. Other non-limiting examples of computer-readable media include flash-type memories or other known types of memories.

The disclosed exemplary embodiments provide methods and apparatuses for evaluating anisotropy parameters from seismic data using statistical moments. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method evaluating anisotropy parameters using statistical moments, the method comprising:
    obtaining seismic data considered as reflectivity values associated with pairs of incidence, $\theta$, and azimuth $\varphi$ angles related to an explored formation;
    calculating second central moment, $m_2(\theta)$, for at least two different incident angles and third central moment, $m_3(\theta)$, for at least one incident angle at a location within the explored formation using the reflectivity values;
    determining tangential and normal weaknesses for the location using the calculated second and third central moments, and
    planning hydrocarbon extraction using fracture characterization based on the determined tangential and normal weaknesses.

2. The method of claim 1, wherein the tangential and normal weaknesses are determined by representing the calculated second central moments and the anellipticity variation in a two dimensional space of the tangential and normal weaknesses.

3. The method of claim 1, wherein a third central moment is calculated for another angle and the tangential and normal weaknesses are determined using the two calculated third central moments and the anellipticity variation in a two dimensional space of the tangential and normal weaknesses.

4. The method of claim 1, wherein a calculated second moment for an incidence angle is represented as an ellipse, a calculated third central moment as a hyperbola and the anellipticity variation as a line in a two dimensional space of the tangential and normal weaknesses.

5. The method of claim 4, wherein parameters defining the ellipse, the hyperbola and/or the line are calculated using a square of the S-wave and P-wave velocity ratio, g, of the non-fractured rock and trigonometric functions of the incidence angle.

6. The method of claim 1, further comprising:
    calculating an anisotropic gradient, $B_{ani}$, for small angles using $n^{th}$ central moments, where n is even.

7. The method of claim 6, wherein $$B_{ani} \approx \frac{2\sqrt{2}}{\sin^2(\theta)} \sqrt{m_2(\theta)}.$$

8. The method of claim 1, further comprising:
    inferring a $2^{nd}$ Fourier coefficient for an incidence angle using a Fourier transform; and
    evaluating an anellipticity variation, $\Delta\eta$, using the third central moment for the incidence angle, the inferred $2^{nd}$ Fourier coefficient and trigonometric functions of the incidence angle.

9. The method of claim 8, wherein $$\Delta\eta = \frac{64}{3} \frac{1}{\sin^2\theta\tan^2\theta} \frac{1}{r_2^2(\theta)} m_3(\theta).$$

10. The method of claim 1, further comprising:
    removing a 90-degree ambiguity on the anisotropy orientation obtained from the phase of the $2^{nd}$ FC, using the tangential and normal weaknesses.

11. An apparatus for evaluating anisotropy parameters from seismic data using statistical moments, the apparatus comprising:
    an interface configured to obtain seismic data considered as reflectivity values associated with pairs of incidence, $\theta$, and azimuth $\varphi$ angles related to an explored formation; and
    a data processing unit including one or more processors, the data processing unit being configured
        to calculate second central moment, $m_2(\theta)$, for at least two different incident angles and a third $m_3(\theta)$ central moment for at least one incident angle at a location within the explored formation using the reflectivity values,
        to determine tangential and normal weaknesses for the location using the calculated second and third central moments, and
        to plan hydrocarbon extraction using fracture characterization based on the determined tangential and normal weaknesses.

12. The apparatus of claim 11, wherein data processing unit is configured to determine the tangential and normal weaknesses by representing the calculated second moments and the anellipticity variation in a two dimensional space of the tangential and normal weaknesses.

13. The apparatus of claim 11, wherein the data processing unit is further configured to calculate a third central moment for another angle, and to determine the tangential and normal weaknesses by representing the two calculated third moments and the anellipticity variation in a two dimensional space of the tangential and normal weaknesses.

14. The apparatus of claim 11, wherein a calculated second moment for an incidence angle is represented as an ellipse, a calculated third central moment as a hyperbola and the anellipticity variation as a line in a two dimensional space of the tangential and normal weaknesses.

15. The apparatus of claim 14, wherein parameters defining the ellipse, the hyperbola and/or the line are calculated using a square of the S-wave and P-wave velocity ratio, g, of the non-fractured rock and trigonometric functions of the incidence angle.

16. The apparatus of claim 11, wherein the data processing unit is further configured:
    to calculate an anisotropic gradient, $B_{ani}$, for small angles using $n^{th}$ central moments where n is even.

17. The apparatus of claim 16, wherein the data processing unit calculates $B_{ani}$ using the formula $$B_{ani} \approx \frac{2\sqrt{2}}{\sin^2(\theta)} \sqrt{m_2(\theta)}.$$

18. The apparatus of claim 11, wherein the data processing unit is further configured:
to inferring a $2^{nd}$ Fourier coefficient for an incidence angle using a Fourier transform; and
to evaluate an anellipticity variation, $\Delta\eta$, using the third central moment for the incidence angle, the inferred $2^{nd}$ Fourier coefficient and trigonometric functions of the incidence angle.

19. The apparatus of claim 11, wherein the data processing unit calculates $\Delta\eta$ using the formula $$\Delta\eta = \frac{64}{3} \frac{1}{\sin^2\theta\tan^2\theta} \frac{1}{r_2^2(\theta)} m_3(\theta).$$

20. A computer readable recording medium non-transitorily storing executable codes which when executed by a computer make the computer perform a method for evaluating anisotropy parameters from seismic data using statistical moments, the method comprising:
obtaining seismic data considered as reflectivity values associated with pairs of incidence, $\theta$, and azimuth $\varphi$ angles related to an explored formation;
calculating second central moment $m_2(\theta)$ for at least two different incident angles and a third $m_3(\theta)$ central moment for at least one incident angle at a location within the explored formation using the reflectivity values;
determining tangential and normal weaknesses for the location using the calculated second and third central moments; and
planning hydrocarbon extraction using fracture characterization based on the determined tangential and normal weaknesses.

* * * * *